(12) United States Patent
Voznika et al.

(10) Patent No.: US 9,734,090 B2
(45) Date of Patent: Aug. 15, 2017

(54) PARTITIONED REFERENCE COUNTER

(75) Inventors: Fabricio D. Voznika, Kenmore, WA (US); Haitao Wang, Issaquah, WA (US); Jack S. Richins, Bothell, WA (US); Jasraj Dange, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 463 days.

(21) Appl. No.: 13/530,082

(22) Filed: Jun. 21, 2012

(65) Prior Publication Data
US 2013/0346707 A1    Dec. 26, 2013

(51) Int. Cl.
G06F 9/46       (2006.01)
G06F 12/126   (2016.01)

(52) U.S. Cl.
CPC .................................. G06F 12/126 (2013.01)

(58) Field of Classification Search
None
See application file for complete search history.

(56) References Cited

U.S. PATENT DOCUMENTS

| | | | |
|---|---|---|---|
| 6,851,030 B2 | 2/2005 | Tremaine | |
| 7,133,977 B2* | 11/2006 | Pudipeddi et al. | 711/152 |
| 7,200,721 B1 | 4/2007 | Lang et al. | |
| 7,565,398 B2* | 7/2009 | Ashok et al. | 709/203 |
| 8,032,498 B1 | 10/2011 | Armangau et al. | |
| 8,060,880 B2* | 11/2011 | Cherem et al. | 718/102 |
| 8,250,111 B2* | 8/2012 | Huras et al. | 707/802 |
| 8,775,373 B1* | 7/2014 | Ross et al. | 707/612 |
| 2004/0255087 A1* | 12/2004 | Pudipeddi | G06F 12/0261 711/152 |
| 2010/0223243 A1* | 9/2010 | Huras | G06F 17/30306 707/705 |
| 2011/0246727 A1* | 10/2011 | Dice | G06F 12/0261 711/150 |
| 2012/0137082 A1* | 5/2012 | Mall | G06F 12/126 711/147 |

(Continued)

OTHER PUBLICATIONS

Suh, et al., "Dynamic Cache Partitioning for Simultaneous Multi-threading Systems", Retrieved at <<http://csg.csail.mit.edu/pubs/memos/Memo-446/memo-446.pdf>>, IASTED International Conference on Parallel and Distributed Computing and Systems, Aug. 2001, pp. 09.

(Continued)

*Primary Examiner* — Tammy Lee
(74) *Attorney, Agent, or Firm* — Harness, Dickey & Pierce, P.L.C.

(57) ABSTRACT

Resource use is recorded with a partitioned reference counter. The sum of all resource counter partitions is equivalent to the total references to a resource. When one resource counter partition reaches zero, it is possible that the resource should be destroyed. To determine if this is the case, all other partitions can be checked for a value of zero. If all the partitions are zero, the resource can be destroyed. Coarse grained partitioning and add/release on all partitions can be employed to avoid extra work associated with a local partition reaching zero. Further, destroying or deleting a resource can be accomplished in a manner that avoids a race condition.

21 Claims, 13 Drawing Sheets

(56) References Cited

U.S. PATENT DOCUMENTS

2012/0317586 A1* 12/2012 Clevenger et al. ........... 719/313

OTHER PUBLICATIONS

Ng, Tony C., "Efficient Garbage Collection for Large Object-Oriented Databases", Retrieved at <<http://citeseerx.ist.psu.edu/viewdoc/download?doi=10.1.1.48.1337&rep=rep1&type=pdf>>, Technical Report MIT/LCS/TR-692, May 1996, pp. 54.

Artiaga, et al., "A Practical Study on Locking and Reference Counting in the Mach 3.0 Kernel", Retrieved at <<http://citeseerx.ist.psu.edu/viewdoc/download?doi=10.1.1.51.5903&rep=rep1&type=pdf>>, Department of Computer Architecture (DAC-UPC), Report UPC-DAC-1995-49, Dec. 22, 1995, pp. 1-25.

Sanchez, et al., "Vantage: Scalable and Efficient Fine-Grain Cache Partitioning", Retrieved at <<http://www.stanford.edu/~sanchezd/papers/2011.vantage.isca.pdf>>, 38th annual international symposium on Computer architecture, Jun. 4-8, 2011, pp. 57-68.

Plakal, et al., "Concurrent Garbage Collection Using Program Slices on Multithreaded Processors", Retrieved at <<http://research.cs.wisc.edu/areas/pl/seminar/fal00/manoj.pdf>>, 2000 International Symposium on Memory Management, Retrieved Date: Oct. 5, 2000, pp. 11.

* cited by examiner

PARTITIONED REFERENCE COUNTER

BACKGROUND

Reference counting is a widely used technique to track resource lifetime and decide when it is safe to delete a resource. A resource can be an object, pointer, or handle, or block of memory, among other things. A reference counter is employed to record when a resource is being used to enable a decision to be made as to when the resource can be destroyed. More particularly, the reference counter can be incremented when a resource is used and decremented when the resource is not needed anymore. If the reference counter reaches zero, the resource can be safely disposed by the last user of the resource since the resource is no longer being used.

Performance issues can occur in a multi-processor computing system when a reference counter is employed with respect to a resource that is commonly used by several processors. The reference counter is conventionally stored in a region of main memory (e.g., RAM). Every time a resource is used, the counter can be incremented in this region of memory. If the resource is utilized frequently, the memory can be incremented quite often. In a very large system with several processors, each processor caches (e.g., level 1 (L1) or level 2 (L2)) the reference counter. However, if a resource is utilized a lot the cache can be invalidated frequently and require reloading. This operation can take time, because the processor has to be called to throw away the cached data and acquire data from main memory.

Conventionally, a compare-and-swap operation is employed for best performance. The compare-and swap operation is an operation for shared memory systems that compares content of a memory location to a specified value, and if the content of the memory location is the same as the specified value, the content of the memory location is updated. There are two ways to implement this operation. The simple way is to take a lock before the counter is incremented, or decremented, and subsequently release the lock. Here, however, performance is hindered by forcing serialization by way of locking. There is hardware that allows counters to be incremented or decremented atomically across all processors. In this case, a lock need not be taken but rather a special compare-and-swap instruction can be called, which will increment the counter, for example, atomically without corrupting the value.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to a partitioned reference counter. A reference counter is divided into multiple counters or partitions where the sum of all partitions is equivalent to the total number of references to a resource. A partitioned reference counter spreads access to a reference counter, which reduces contention especially in multi-processor systems. Whenever a local reference-counter partition goes to zero, all other partitions can be checked for zero to determine whether the resource should be disposed of, or in other words destroyed. It can be frequent that a local partition reaches zero while a resource is still referenced in other remote partitions, causing partitions to be checked for no reason, wasting computing resources. To avoid this issue, partitions can be coarse-grained to reduce the likelihood that a local reference counter partition reaches zero. Additionally or alternatively, when a resource lifetime is controlled by a longstanding reference add/release can be performed on all partitions, which prevents local partitions reaching zero while the longstanding reference is held. Furthermore, a resource deletion mechanism can be employed that avoids a race condition.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Performance issues can occur in the context of reference counting when resources are commonly used by several processors at a time in a multiple processor-computing environment. Conventionally, a reference counter is updated with a special compare-and-swap operation for best performance. However, the compare-and swap operation only helps to a degree. In extreme cases and/or high-end machines, the compare-and-swap operation alone can cause performance bottlenecks for resources that are accessed frequently from different processors.

Details below are generally directed toward a partitioned reference counter. A reference counter can be divided into multiple counters, or partitions, where the sum of all partitions is equivalent to the total number of references to a resource. A thread of execution operates in a single partition most of the time. Spreading access to the resource counter across partitions reduces contention. Further, given that contention increases exponentially with the number of processors, employment of multiple counters can improve performance considerably in multi-processor systems.

When one resource counter partition reaches zero, it is possible that the resource should be destroyed. To determine if this is the case, all other partitions can be checked for a value of zero. If all the partitions are zero, the resource can be destroyed. Accordingly, extra work is required when a partition reaches zero. However, coarse grained partitioning and add/release on all partitions, among other things can be employed to help avoid this extra work. Coarse-grained partitioning increases sharing, which reduces the chance that a local reference-counter partition reaches zero and reduces the number of partitions that need to be checked. When a resource lifetime is controlled by a longstanding reference, add/release can be performed on all partitions, which prevents a local reference-counter partition from reaching zero so long as the longstanding reference is held. Further, destroying or deleting a resource can be accomplished in a manner that avoids a race condition, for example by utilizing multiple stages.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
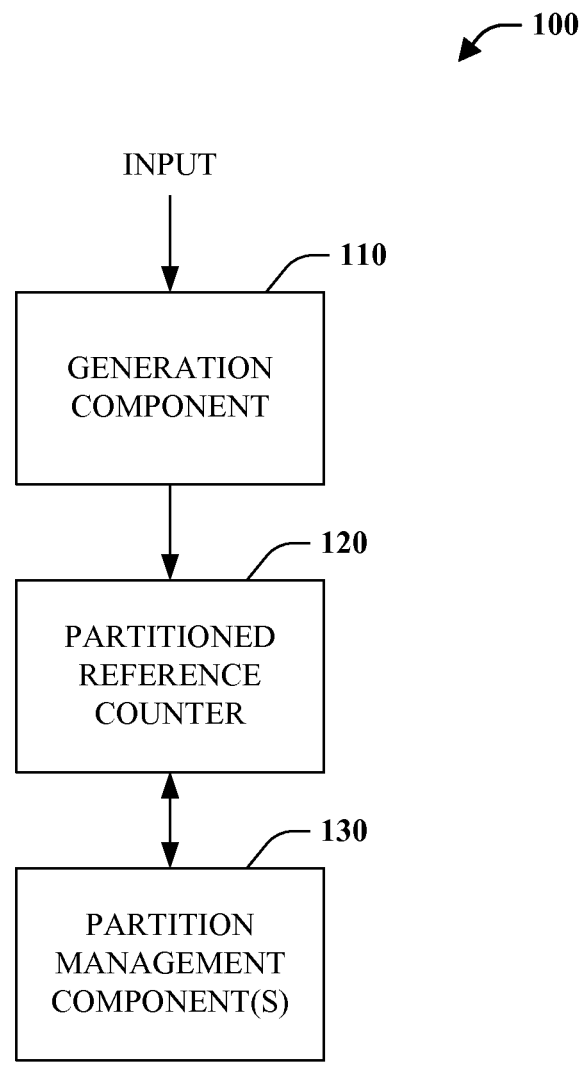
FIG. 1 is a block diagram of a resource management system.

Referring initially to FIG. 1, resource management system 100 is illustrated. The resource management system 100 manages the lifetime of resources such as objects, pointers, or handles, or blocks of memory, among other things. Lifetime can be managed with a reference counter that records resource use, and more particularly a partitioned reference counter. The resource management system 100 includes generation component 110, partitioned reference counter 120, and partition management component 130.

The generation component 110 is configured to generate the partitioned reference counter. The partitioned reference counter 120 is a reference counter that is divided into multiple counters, or in other words partitions. The sum of all counters, or partitions, can be equivalent to the total number of references to a particular resource. Spreading access to the resource counter across partitions reduces contention. In addition, performance can be improved considerably in multi-processor systems given that contention increases exponentially with the number of processors. The number of partitions can vary based on computer system infrastructure and/or other factors.

Figure 2:
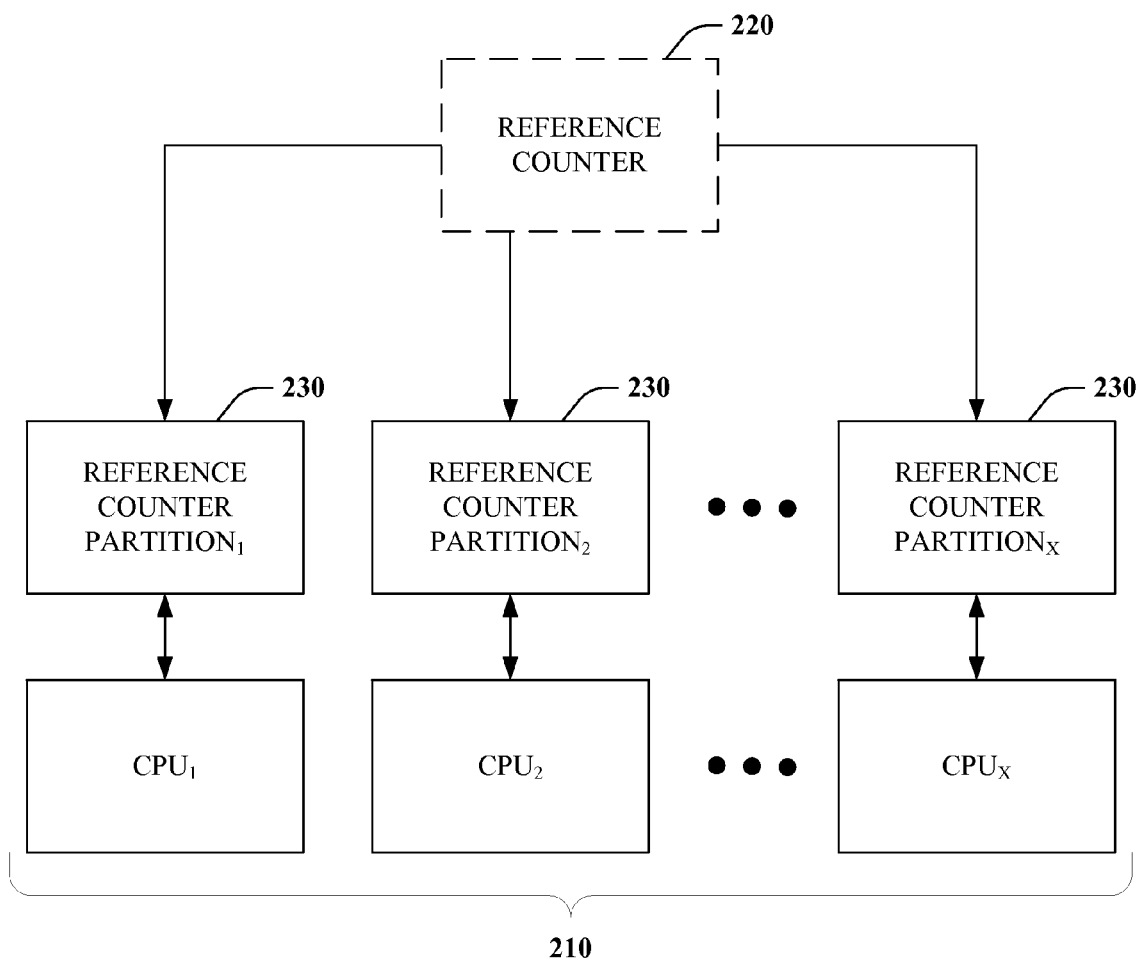
FIG. 2 is a block diagram of per processor reference counter partitioning.

Turning briefly to FIG. 2, per processor partitioning is illustrated in accordance with one embodiment. Here, a multi-processor system includes a plurality of central processing units 210 ($CPU_1$-$CPU_x$, where "X" is an integer greater than one). Reference counter 220 can be divided across the plurality of central processing units 210. More particularly, a reference counter partition can be generated for each central processing unit. Accordingly, a plurality of reference counter partitions 230 (REFERENCE COUNTER PARTITION$_1$-REFERENCE COUNTER PARTITION$_x$, where "X" is an integer greater than one) of the same number as the plurality of central processing units 210. The set of reference counter partitions 230 corresponds to a partitioned reference counter as described and used herein.

The reference counter partitions 230 can be stored in cache memory for corresponding central processing units 210, for example.

Returning to FIG. 1, the generation component 110 can be configured to generate the partitioned reference counter dynamically in accordance with one embodiment. A conventional un-partitioned reference counter can be employed initially and upon detecting or inferring performance degradation as defined by one or more metrics, the reference counter can be partitioned. For example, if contention is detected based on a number of compare and swap operations that fail and that contention exceeds a threshold, the generation component 110 can initiate partitioning in response to the contention. Further, the number of partitions can be adjusted (e.g., expand or shrink) dynamically as a function of contention to optimize performance. Additional performance improving techniques, as described later herein, can also be initiated by the generation component 110 upon initial partitioning or runtime adjustment.

The partition management component 130 is configured to manage a reference counter partition. Accordingly, a partition management component 130 can exist for a partition. Management of a reference counter can include, among other things, incrementing the counter when a resource is used and decrementing the counter once the resource is not needed anymore as well as disposing of a resource when all partitions have zero references. Additionally, the partition management component 130 can utilize and exploit the benefits of a conventional, non-locking, atomic compare-and-swap operation when incrementing and decrementing a reference counter.

Figure 3:
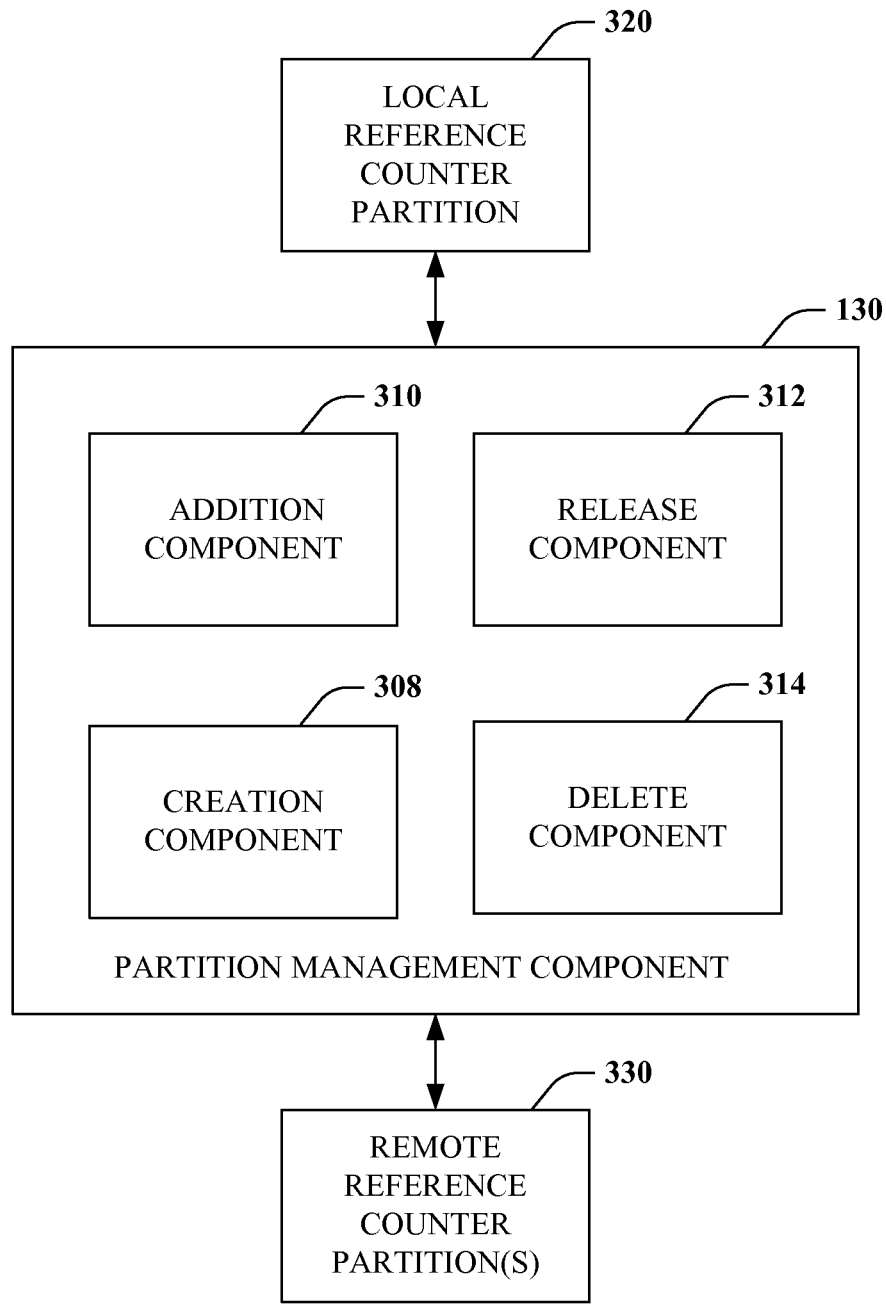
FIG. 3 is a block diagram of a representative partition-management component.

FIG. 3 illustrates a representative partition management component 130 in further detail. The partition management component 130 includes creation component 308, addition component 310, release component 312, and delete component 314. Further, the partition management component 130 interacts with a local reference counter partition 320 and one or more remote reference counter partitions 330. Here, the local reference counter partition 320 is local or near the partition management component 130. In other words, the reference counter is part of the same partition with the partition management component 130. By contrast, the remote reference counter partition(s) 330 is remote, or relatively far from, this partition management component 130 and can include another reference counter partition local thereto.

The creation component 308 is configured to set the local reference-counter partition to one upon initial creation of a resource. For example, when an object is first created in main memory the local reference-counter partition can be incremented from zero to one denoting a single reference to the object. Subsequently, references to the object can be added and released.

The addition component 310 is configured to increment the local reference counter partition 320 each time a reference is added to a resource. The release component 312 is configured to decrement the local reference counter partition 320 when a reference to a resource is released. However, if the local reference-counter partition for a particular resource has a count of zero, the release component 312 can be configured to decrement a remote reference counter partition 330 with a count for a particular resource greater than zero. There is no harm to correctness because the sum of all partitions includes the correct reference count. This is not a common scenario, however, because add/release happens on the same thread/partition most of the time.

Whenever the local reference counter partition 320 reaches zero upon release of a reference it is possible that the corresponding resource should be deleted, or in other words disposed of or destroyed. To determine if this is the case, all partitions are checked for a value of zero including all remote reference counter partitions 330. If all reference count partitions have a value of zero for the same resource, the resource can be disposed. Since there is extra work involved when a local reference counter partition reaches zero, it is desirable to avoid such a case. However, due to the nature of partitioning, it will be frequent that a local partition reaches zero while the resource is still referenced in other partitions. This will cause partitions to be re-checked for no reason, wasting cycles. Two techniques can be utilized in furtherance thereof, namely course grained partition and add/release on all partitions.

Figure 4:
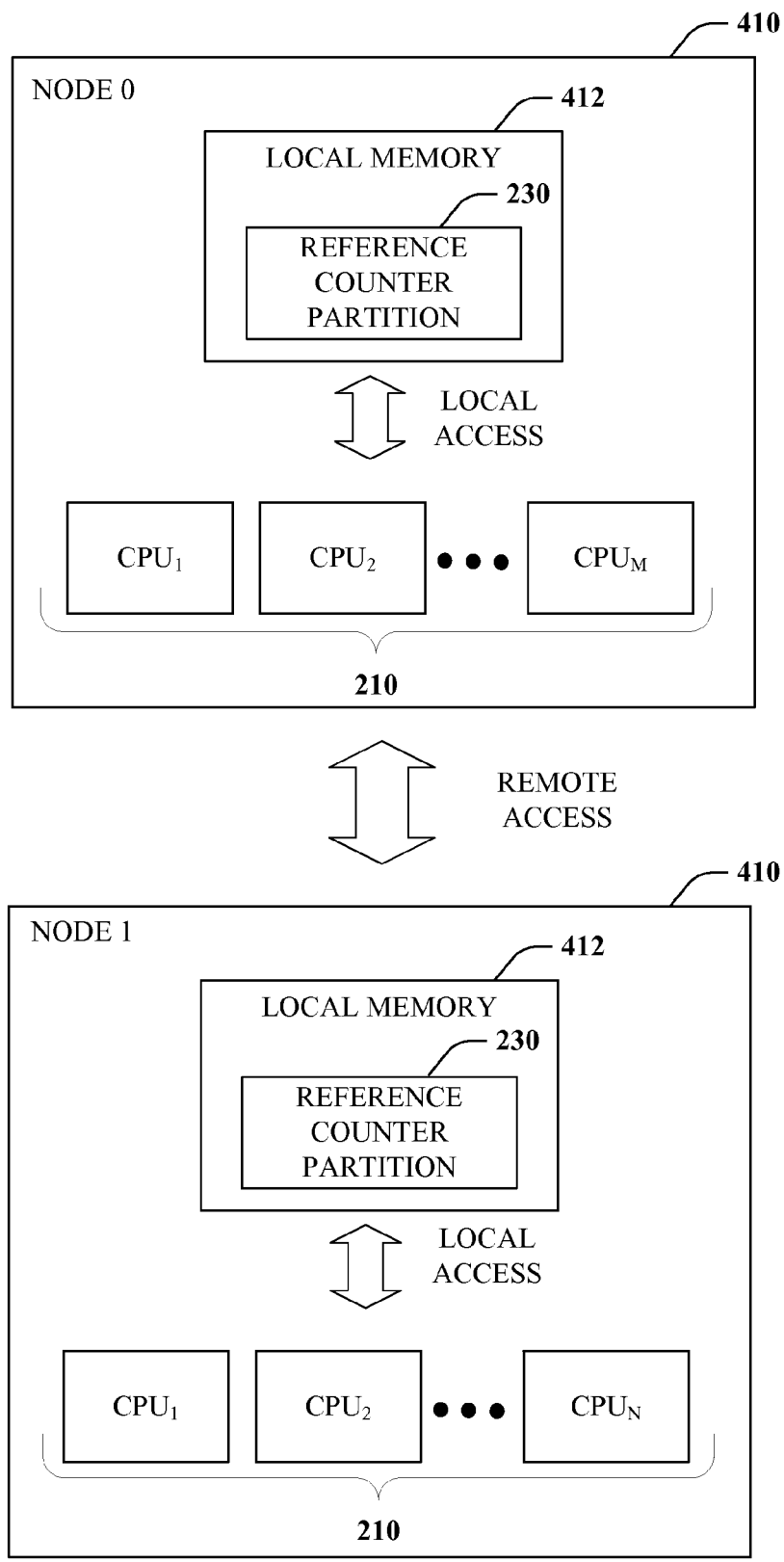
FIG. 4 is a block diagram illustrating a reference counter partitioned across NUMA nodes.

Rather than utilizing fine-grained partitions, course-grained partitions can be employed. For example, partitions can be created per non-uniform memory access (NUMA) node instead of per processor. In most cases, contention on a reference counter is not so great as to require partitioning on a per processor basis. FIG. 4 is a block diagram illustrating a reference counter partitioned across NUMA nodes. Here, two NUMA nodes 410 are illustrated, namely "node 0" and "node 1." Each node includes a plurality of central processing units 210 that interact with a reference counter partition 230 stored in a local memory 412, or cache, accessible locally by the plurality of central processing units 210. Additionally, the plurality of central processors 210 can remotely access the reference counter partition of another node (a.k.a. remote reference-counter partition), for instance to check if the counter has a value of zero for a particular resource. Utilizing such a coarse-grained approach increases sharing and thus reduces the chances that a local partition reaches zero. Further, this approach reduces the number of partitions that need to be checked, therefore reducing wasted cycles.

In many cases, resource lifetime is controlled by a single longstanding reference. In accordance with the add/release-on-all-partitions technique, any known or predetermined longstanding reference can be added to all partitions and released from all partitions. This mechanism avoids local partitions becoming zero so long as this distinctive reference is held. If other resources are using the resource, the counter will be incremented above zero, but it will not go to zero so long as the longstanding reference is held, thus eliminating the need to check all other partitions. A resource can have multiple special references as long as add and release operations on all partitions are match. In this context the sum of all counts will no longer equal the total number of references, however correctness is not an issue if an add to all partitions is followed sometime later by a release to all partitions.

Other techniques and implementations of the above techniques are possible and contemplated. By way of example, and not limitation, consider again a resource that holds reference for a relatively long time. A particular partition can be incremented in this situation rather than all partitions. This particular partition can be the first partition checked when a local reference-counter partition goes to zero. Consequently, all partitions need not be checked. Rather, this single partition can be checked to determine if a longstanding reference is held.

The delete component 314 is configured to dispose or destroy a resource when the resource is no longer being utilized. In accordance with one embodiment, the delete component 314 is configured to avoid a race condition, which is where the result of a process is dependent on the sequence or timing of events. This can be accomplished utilizing a two-phase approach. First, the delete component can check whether all partitions are zero for a particular resource. However, this alone is not enough because of the following race condition described below with respect to Table 1.

TABLE 1

| | Part 0 | Part 1 | Part 2 | Part 3 | Notes |
|---|---|---|---|---|---|
| Step 1 (T1) | 1 | 0 | 0 | 1 | Thread 1 decrements partition 0. Other partitions 0? |
| Step 2 (T1) | 0 | 0 | 0 | 1 | T1 reads partitions 0 to 2 when another thread (T2) comes in before it reads partition 3. |
| Step 3 (T2) | 0 | 0 | 1 | 1 | T2 increments partition 2. |
| Step 4 (T2) | 0 | 0 | 1 | 0 | T2 decrements partition 3 and T1 reads it. T1 will see all partitions set to 0, which is not true. |

Table 1 includes four partitions (Part 0, Part, 1, Part 2, and Part 3) and steps performed by two threads of execution that interact with the partitions. Steps one and two are performed by a first thread (T1) and steps three and four are performed by a second thread (T2). The starting condition of the partitioned reference counter is (1, 0, 0, 1). Step one decrements partition zero. In step two, a determination begins as to whether all partitions are zero. Here, the first thread reads partitions zero, one and two determining that all three are zero. However, before the first thread reads partition three, the second thread increments partition two and decrements partition three. After the first thread reads partition three, a conclusion is made that all partitions are zero when that is not in fact the case.

Such a race condition can be resolved by transitioning partitions from zero to negative one (or some other distinct value) after detecting all zeros. If during this process, it is determined that any partition is a non-zero (including negative one), deletion can be aborted and changes undone, such as transitioning partitions from negative one to zero. If an add or release operation finds a partition of negative one, the operation can be configured to wait, or spin, until the count is no longer negative one. This works because in order to add a reference to an existing resource (as opposed to upon loading/creation), another reference should already exist for a resource. If during add, it is found that the local partition has been marked for deletion (negative one), the operation can spin waiting for the other reference that exists to be found by the deleting thread in which case the deletion operation can be cancelled and the local partition restored to zero. An example of this process is illustrated in Table 2 below.

TABLE 2

| | Part 0 | Part 1 | Part 2 | Part 3 | Notes |
|---|---|---|---|---|---|
| Step 1 (T1) | 1 | 0 | 0 | 1 | Thread 1 decrements partition 0. Other partitions 0? |
| Step 2 (T1) | 0 | 0 | 0 | 1 | T1 reads partitions 0 to 2 when another thread (T2) comes in before it reads partition 3. |
| Step 3 (T2) | 0 | 0 | 1 | 1 | T2 increments partition 2. |
| Step 4 (T2) | 0 | 0 | 1 | 0 | T2 decrements partition 3 and T1 reads it. T1 will see all partitions set to 0, which is not true. |
| Step 5 (T1) | −1 | −1 | 1 | 0 | Now T1 tries to transition all partitions to −1. |
| Step 6 (T1/T2) | −1 | −1 (T2 spins) | 1 (T1 cancels) | 0 | T2 tries to increment reference to partition 1 to attempt to hit same race condition again. Given partition is set to −1, it spins until it changes. Meanwhile, T1 reads partition 2 and finds non-zero partition causing it to abort. |
| Step 7 (T1) | 0 | 0 (T2 spins) | 1 | 0 | T1 reverts all changes |
| Step 8 (T2) | 0 | 1 | 1 | 0 | Now T2 can increment partition 1. |
| Step 9 (T2) | 0 | 1 | 0 | 0 | T2 decrements partition 2. |

Table 2 illustrates a similar example as the one described with respect to Table 1. Accordingly, description begins at step five, after the first thread has determined that all partitions are zero. At step five, the first thread attempts to transition all partitions from zero to negative one. Here, partitions zero and one are successfully transitioned. In step six, the second thread attempts to add a reference to partition one. However, partition one is currently set to negative one, so the second thread will spin, or in other words wait in a loop repeatedly checking the value of the partition for a value other than negative one. Meanwhile, the first thread reads partition two and finds a non-zero partition causing the deletion to be aborted. In step seven, the first thread reverts all changes, transitioning partitions zero and one from negative one to zero. Now, in step eight the second thread can increment partition one, and subsequently decrement partition two in step nine. Note that a reference can be added if there is another reference to a resource. The first thread will find the other reference and revert changes to partitions zero and one, at which point the second thread is resumed and the reference added.

Figure 5:
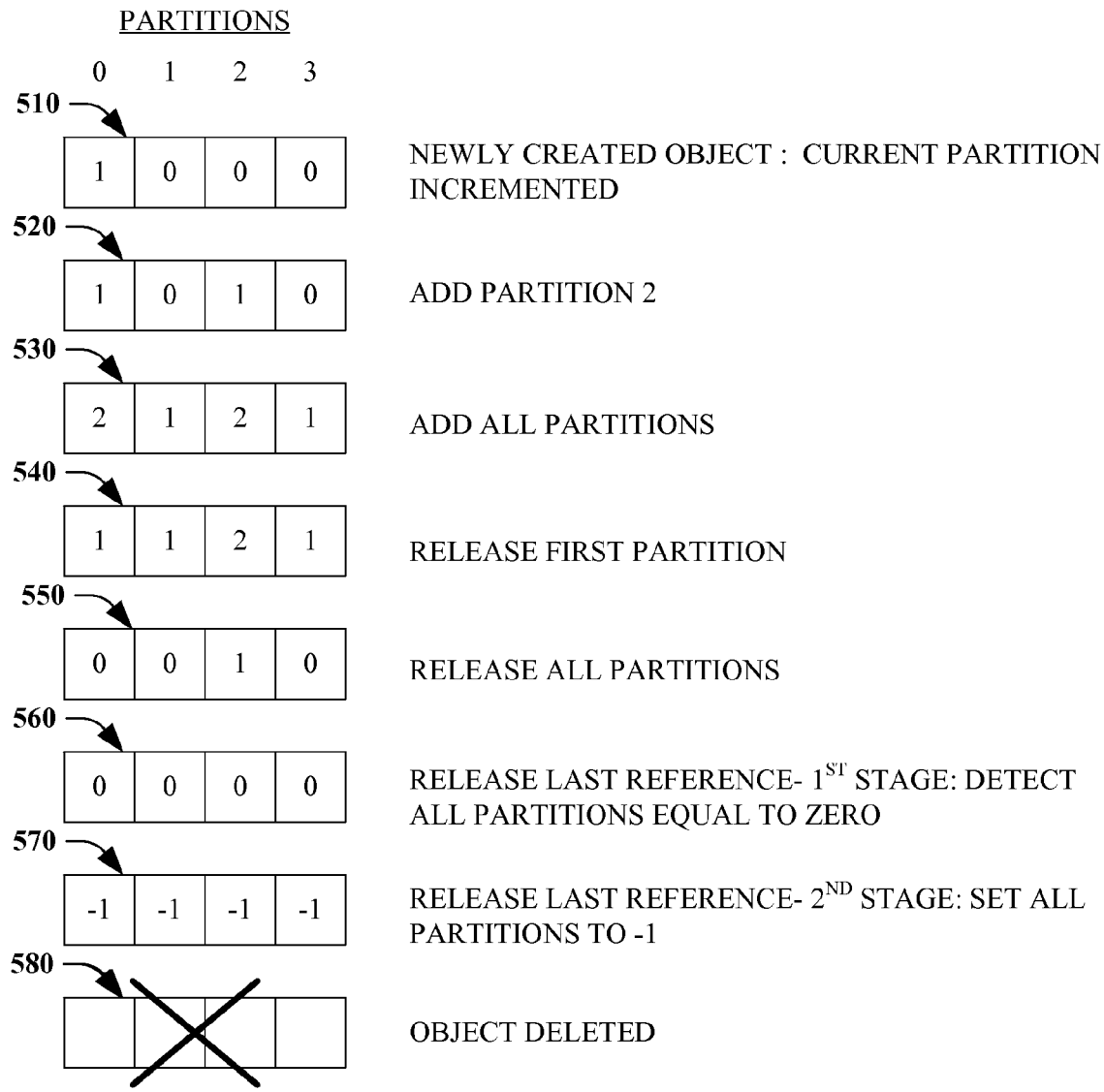
FIG. 5 illustrates an object lifetime example.

Turning attention to FIG. 5 an object lifetime example is depicted illustrating the state of partitions This example includes a four reference counter partitions, partition zero, partition one, partition two, and partition three. At 510, an object is created and the local partition, partition zero, is incremented. Next, at reference 520, a reference is added to partition two. Assume this object is given to the cache or another object holds the lifetime of this object for an extended time, all partitions are incremented at 530. Subsequently, at 540, a reference to partition zero is released. At 550, a release is performed on all partitions, for example upon a decision that the cache no longer needs this object. Next, the last reference is released, at 560, and as part of the first stage of deletion, it can be detected that all partitions are equal to zero. At 570, as part of the second stage of deletion, all partitions are set to negative one. Here, that operation was successful. Thus, at 580, the object is deleted or otherwise destroyed.

The included Appendix illustrates exemplary code that implements aspects described above. This code is meant solely to aid clarity and understanding and not to limit the claimed subject matter thereto. The first part is a class definition that specifies a partitioned reference counter as an array where each element in the array is the local counter for a partition.

"AddRef" gets the counter for the current partition. More specifically, "AddRef" will get a reference to one of the elements of the array and perform compare-and-swap operation to increment the counter. There is additional logic there for a loop, because the compare-and-swap operation could fail, and if it does, the operation can be retried. "AddRef" also include protection against minus one with respect to deletion and the race condition. What it does is every time the counter gets to minus one, all operations stop until that condition goes away.

Release does the opposite of "AddRef." The current counter is acquired first. If the counter is minus one, release will spin waiting until the counter becomes something else. Release will try to decrement the counter and whenever the counter gets to zero will try to delete the resource by calling "TryDelete," which checks if all partitions are zero in a first pass and on the second pass attempts to transition partitions from zero to one and deletes the object if successful. In the case where the current partition is zero and a release is tried, an attempt can be made to decrement another non-zero partition.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the generation component 110 can employ such functionality to determine or infer when and to what extent to partition a reference counter.

In view of the exemplary systems described supra, methodologies that may be implemented in accordance with the disclosed subject matter will be better appreciated with reference to the flow charts of FIGS. 6-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
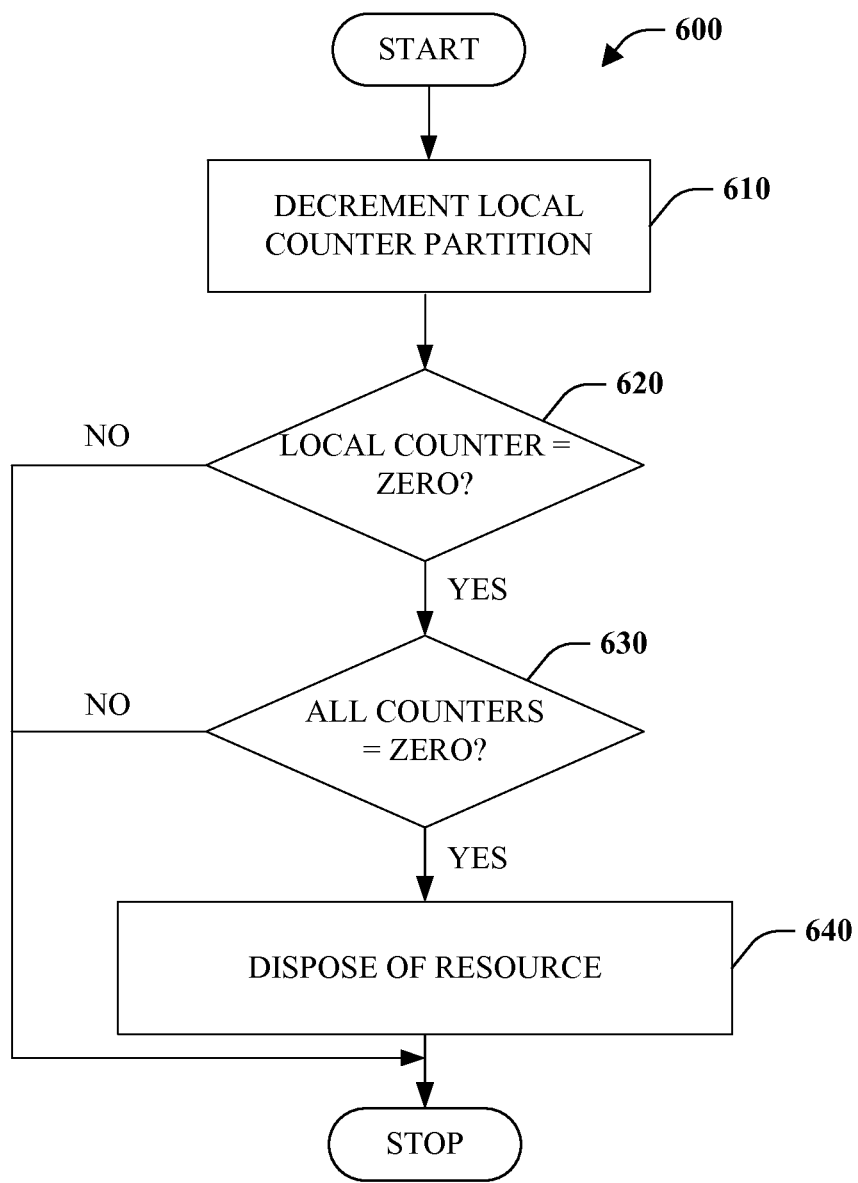
FIG. 6 is a flow chart diagram of a method of releasing a reference to a resource.

Referring to FIG. 6, a method 600 of releasing a reference to a resource is illustrated. At reference numeral 610, a local partition counter is decremented. A check is made at 620 as to whether the local counter is zero. If the reference counter is not zero ("NO"), the method terminates. If the reference counter is zero, a determination is made at 630 as to whether all counter partitions are zero. If not ("NO"), the method terminates. If all counter partitions are zero ("YES"), the resource is disposed, or destroyed at numeral 640.

Figure 7:
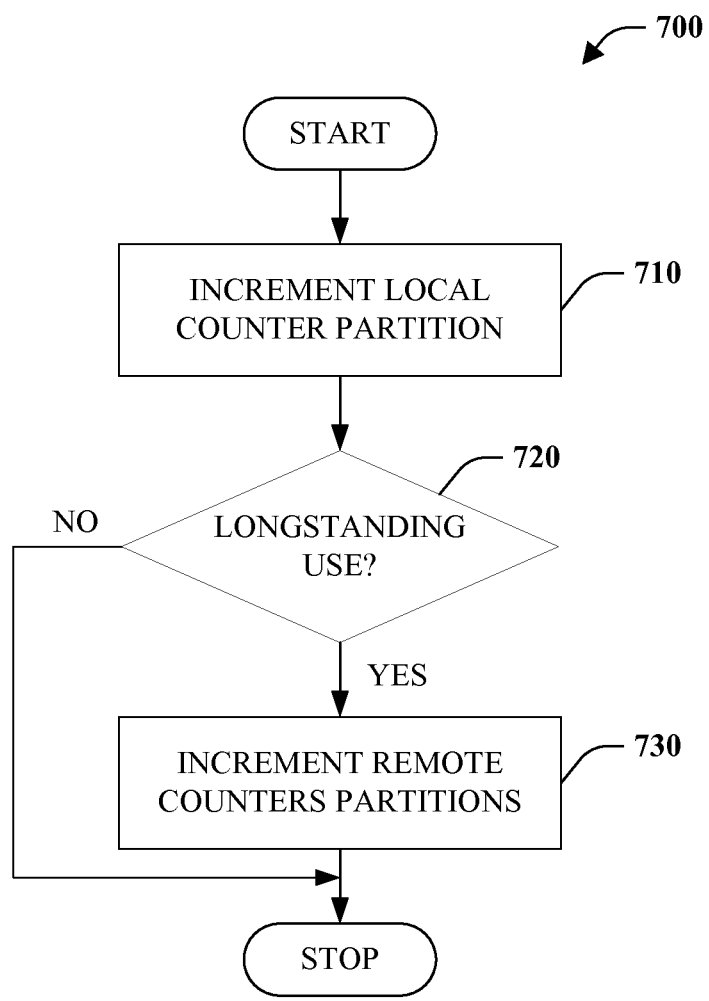
FIG. 7 is a flow chart diagram of a method adding a reference to a resource.

FIG. 7 depicts a method 700 of adding a reference to a resource. At numeral 710, a local counter partition is incremented. A determination is made at 720 as to whether the reference is known or otherwise predetermined to make longstanding use of the resource. If not ("NO"), the method terminates. If so ("YES"), all remote counter partitions are incremented at reference numeral 730, and the method ends. Method 700 corresponds to the add-on-all-partitions technique.

Figure 8:
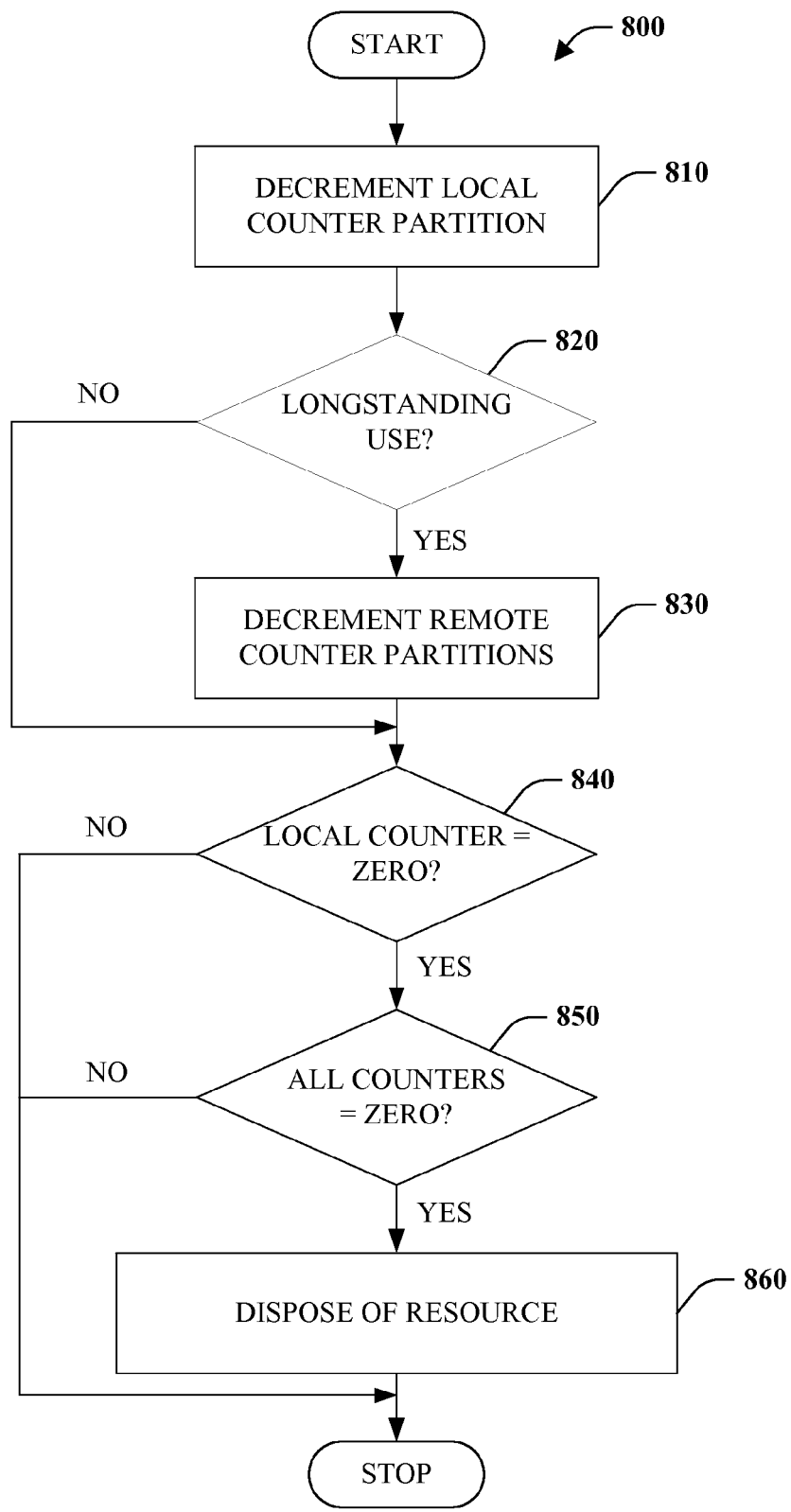
FIG. 8 is a flow chart diagram of method of releasing a reference to a resource.

FIG. 8 illustrates a method 800 of releasing a reference to a resource. At reference numeral 810, the local counter partition is decremented. At numeral 820, a determination is made concerning whether the release reference pertained to a known or predetermined longstanding use. If it does ("YES"), all remote counter partitions are decremented at 830, and the method continues at 840. This corresponds to the release-on-all partitions technique. If the reference does not pertain to a longstanding use ("NO"), the method proceeds directly to 840, where a determination is made as to the local counter partition is zero. If the local counter partition is not zero ("NO"), the method terminates. If the local counter partition is zero ("YES"), the method continues at 850, where a check is made concerning whether all counter partitions are zero. If so ("YES"), the resource is disposed or destroyed. If not ("NO"), the method ends.

Figure 9:
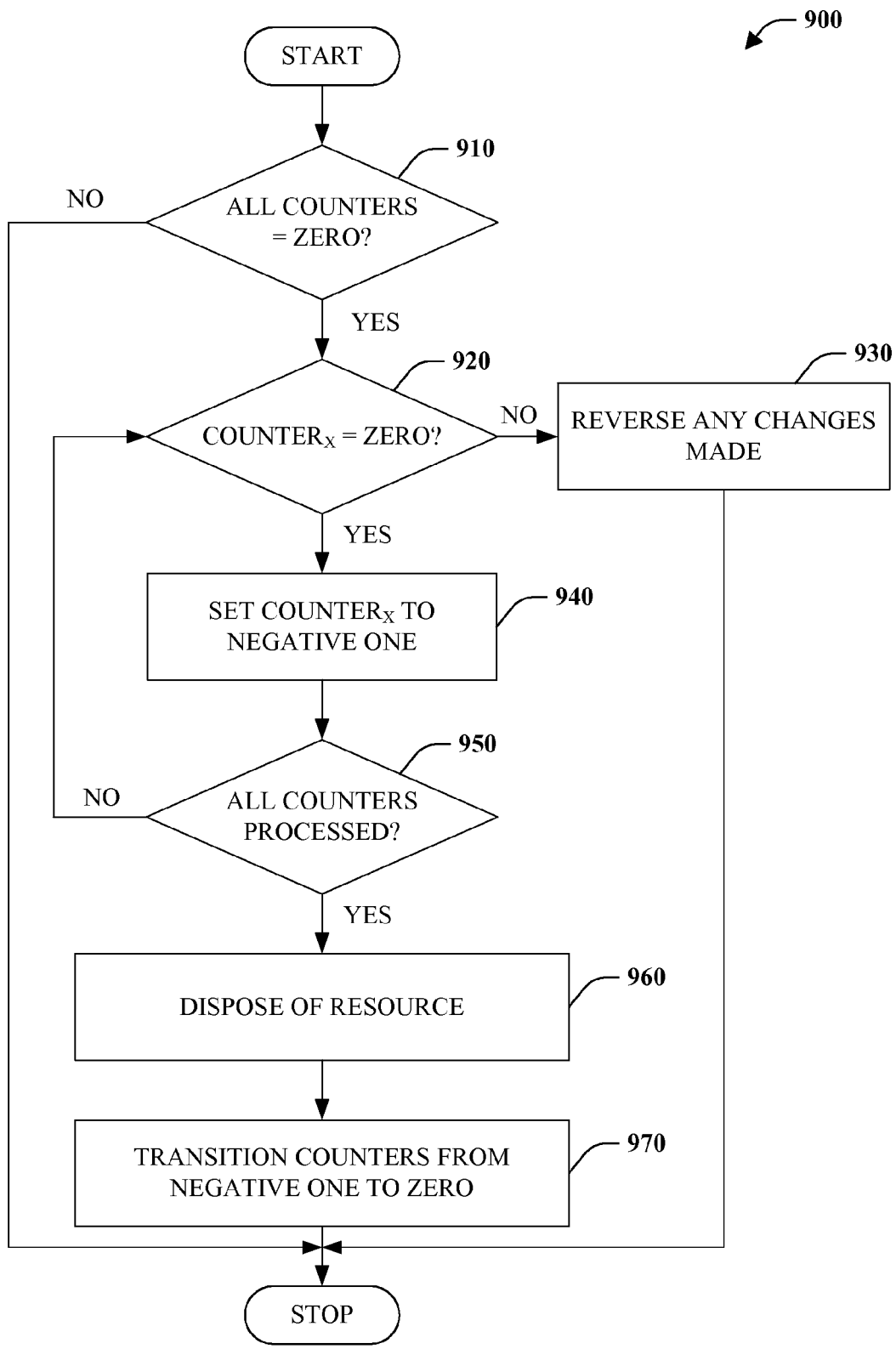
FIG. 9 is a flow chart diagram of a resource deletion method.

FIG. 9 depicts a resource deletion method 900. At reference numeral 910, a determination is made as to whether all counter partitions are zero. If not ("NO"), the method terminates. If so ("YES"), the method proceeds at 920 where a check is made of whether a first counter partition is equal to zero. If so ("YES"), the counter is set to a value indicative of a deletion process such as negative one at 940 and a determination is made as to whether all counter partitions have been processed at 950. If not ("NO"), the method continues back at reference numeral 920. Acts 920 and 940 continue to be performed until all counter partitions have been processed successfully or a counter partition is encountered that is not zero. If at 920, a counter partition is read that is not zero, all previous changes made are reversed at 930 and the method terminates. In partitions, any counters that where transitioned from zero to negative one are transitioned back from negative one to zero. If all counters are processed ("YES") at 950, the method continues at reference numeral 960 where the resource is disposed or deleted. Subsequently or concurrently, the reference counter partitions are transitioned from negative one to zero, at 970, and the method stops.

Figure 10:
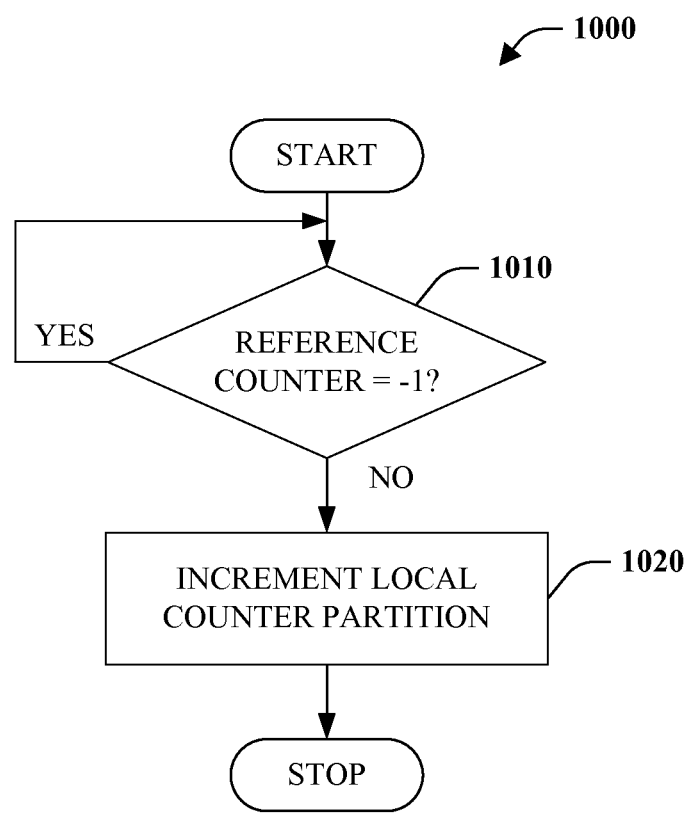
FIG. 10 is a flow chart diagram of a method of adding a reference to a resource.

FIG. 10 is a flow chart diagram of a method 1000 of adding a reference to a reference counter partition. At numeral 1010, a determination is made as to whether the reference counter partition includes a value indicative of a deletion processes such as, but not limited to, negative one. If the reference counter partition is negative one, this can indicate that a deletion method is in progress. When a reference is to be added, another reference already exists, as opposed to when a resource is newly created. Accordingly, if the reference counter of the partition is negative one ("YES"), the method continues to loop back to 1110 until the reference counter changes, which it will once the other reference is located and the deletion process is aborted. If the reference counter is not negative one ("NO"), the method continues at 1020 where the local counter partition is incremented prior to the method ending.

Figure 11:
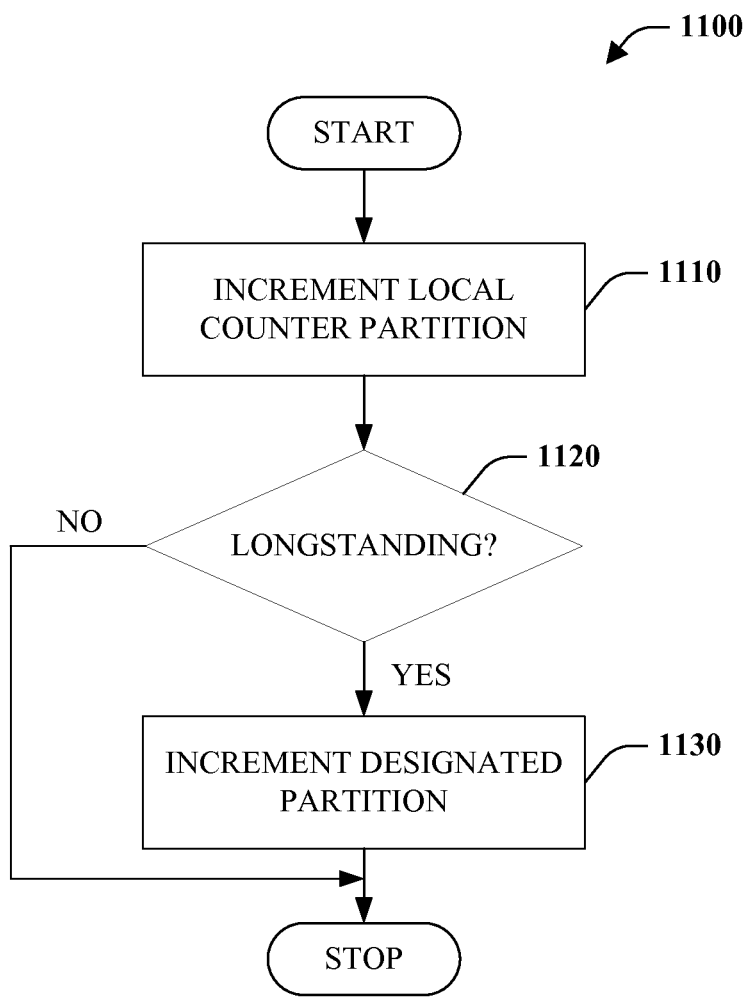
FIG. 11 is a flow chart diagram of a method of adding a reference to a resource.

FIG. 11 illustrates a method 1100 of adding a reference to resource. At reference numeral 1110, a local reference-counter partition is incremented to reflect an added reference to a resource. At numeral 1120, a determination is made as to whether the reference to the resource is known, or is likely, to be longstanding in accordance with some predetermined definition. In other words, the query concerns whether resource lifetime is, or is likely, governed by the reference. If the reference is not longstanding ("NO"), the method terminates. Alternatively ("YES"), the designated reference counter partition is incremented at reference numeral 1130. In one embodiment, the designated reference counter partition can a reference counter dedicated solely to recording longstanding references. In another embodiment, the designated reference-counter partition can be any partition. Where the local reference counter and the designated reference counter are the same, the counter can be incremented twice or only once.

Figure 12:
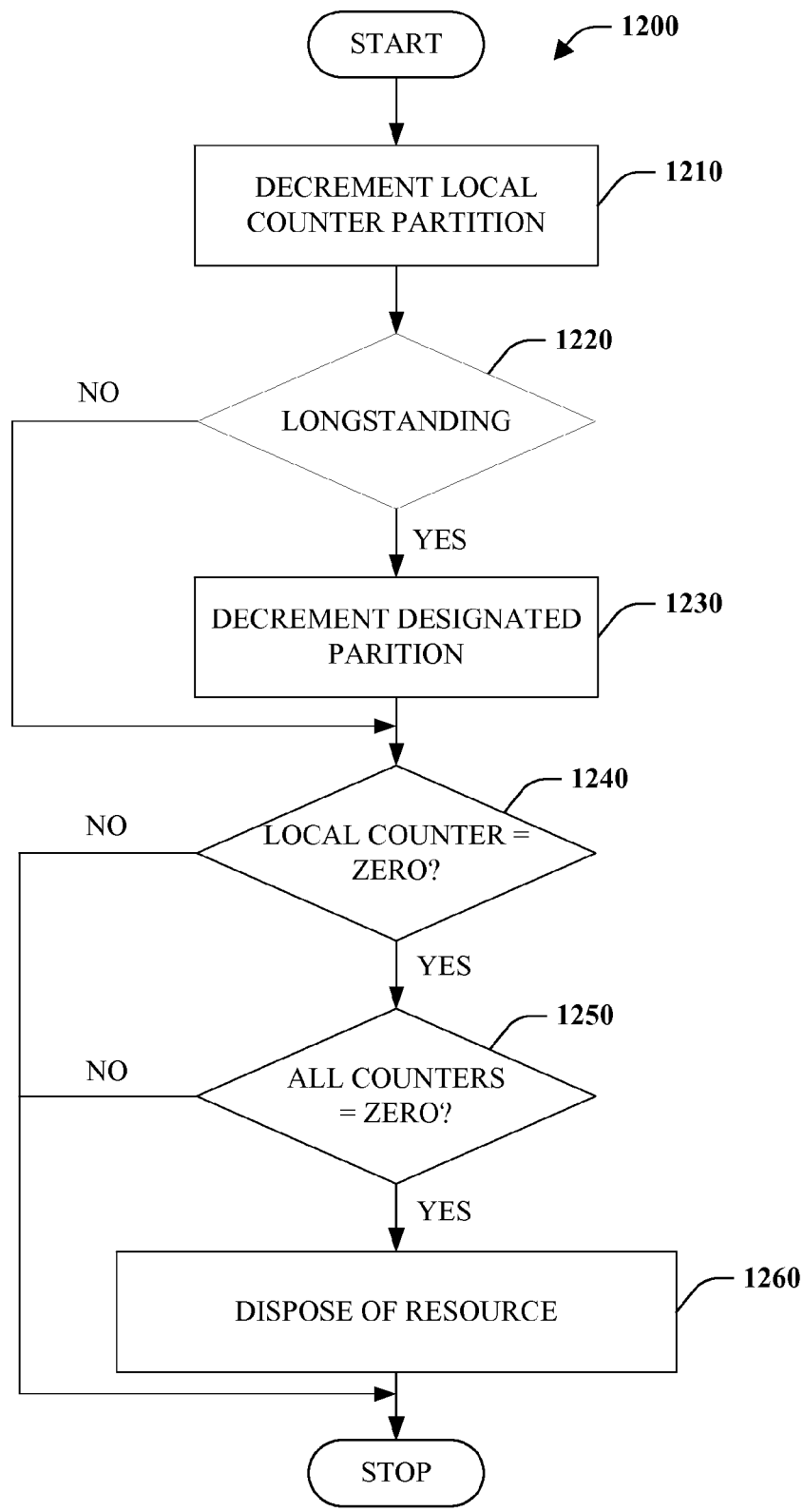
FIG. 12 is a flow chart diagram of a method of releasing a reference to a resource.

FIG. 12 depicts a method 1200 of releasing a releasing a reference to a resource. At reference numeral 1210, a local reference counter partition is decremented reflecting release of a reference to a particular resource. At 1220, a determination is made as to whether the release reference is longstanding in accordance with some definition or other indication. If the reference is longstanding ("YES"), a designated reference-counter partition is decremented at numeral 1230. Alternatively ("NO"), the method proceeds directly to 1240 where a check is made as to whether decrementing the local reference-counter caused the counter to reach zero. If not ("NO"), the method terminates. If so ("YES"), the method continues at 1250 where a determination is made as to whether all partitions are zero. Here, the first reference-counter partition checked can be the designated reference counter partition. In this way if the is a longstanding reference, it can be identified within the first check, and checking other partition is not necessary. As a result, performance is improved. If all reference-counter partitions are not zero ("NO"), the method terminates. If all reference-counter partitions are zero ("YES"), the resource can be disposed at 1260 prior to terminating.

Aspects described herein have broad applicability beyond a high-end, multi-processor system. By way of example, and not limitation, the reference counting techniques described herein can be applied in a distributed computer system. In a distributed computing system, there are network traffic and communication delays where it is helpful to keep a local count if possible. Accordingly, aspects described above are applicable to distributed system cache, or in other words a distributed cache. For instance, cached objects can be deleted locally, and, if necessary, flushed from other nodes in the system. Consider a distributed server with multiple nodes where objects are kept in memory locally but at a certain time deleted from all nodes. Although the implementation would be different, the same or similar mechanisms disclosed herein can be employed.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 13:
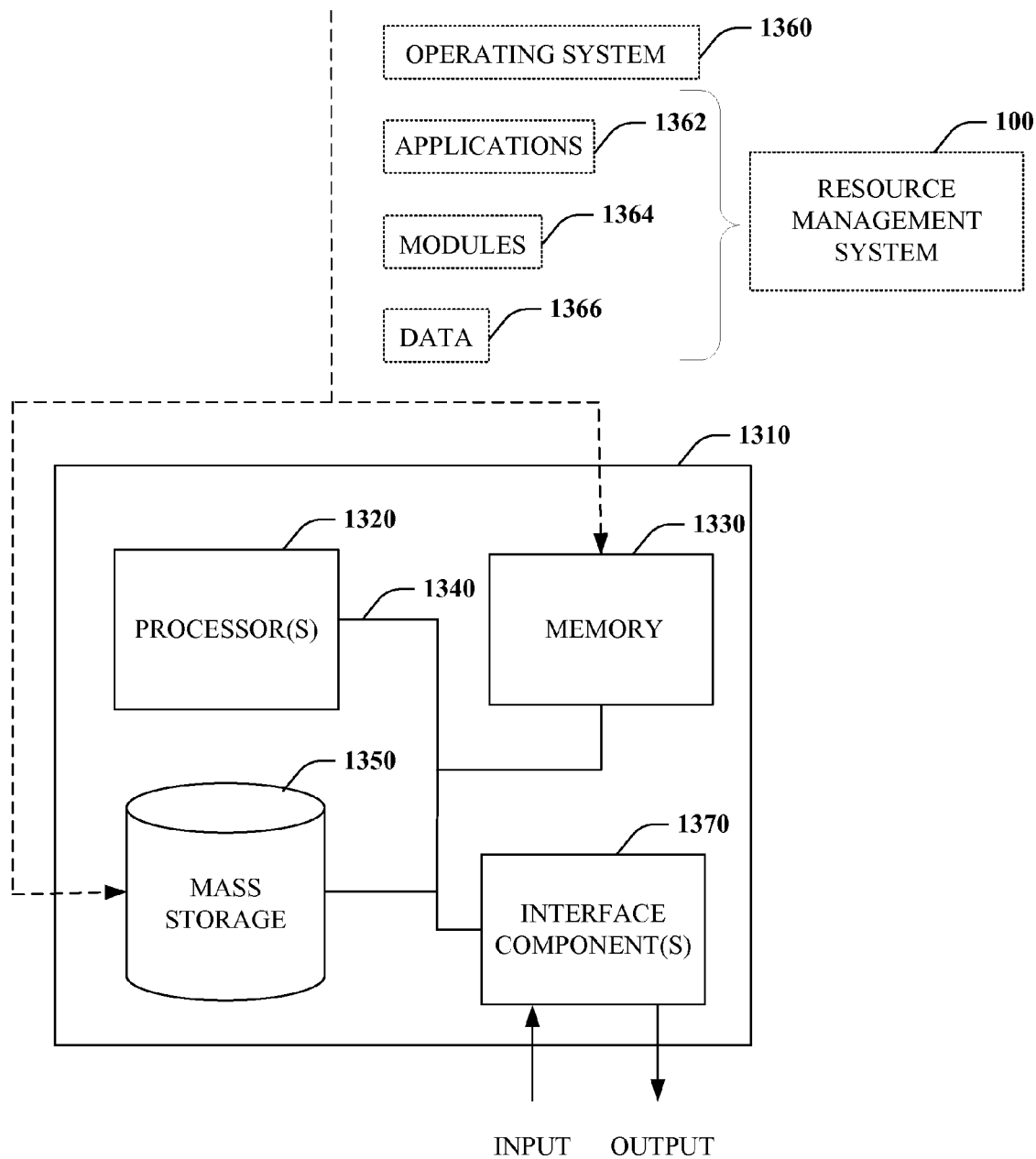
FIG. 13 is a schematic block diagram illustrating a suitable operating environment for aspects of the subject disclosure.

In order to provide a context for the claimed subject matter, FIG. 13 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, virtual machines in a virtualized environment, as well as personal computers, hand-held computing devices (e.g., personal digital assistant (PDA), tablet, phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 13, illustrated is an example general-purpose computer 1310 or computing device (e.g., desktop, laptop, tablet, server, hand-held, programmable consumer or industrial electronics, set-top box, game system . . . ). The computer 1310 includes one or more processor(s) 1320, memory 1330, system bus 1340, mass storage 1350, and one or more interface components 1370. The system bus 1340 communicatively couples at least the above system components. However, it is to be appreciated that in its simplest form the computer 1310 can include one or more processors 1320 coupled to memory 1330 that execute various computer executable actions, instructions, and or components stored in memory 1330.

The processor(s) 1320 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1320 may also be implemented as a combination of computing devices, for example a combination of a DSP and a microprocessor, a plurality of microprocessors, multi-core processors, one or more microprocessors in conjunction with a DSP core, or any other such configuration.

The computer 1310 can include or otherwise interact with a variety of computer-readable media to facilitate control of the computer 1310 to implement one or more aspects of the claimed subject matter. The computer-readable media can be any available media that can be accessed by the computer 1310 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or other like mediums which can be used to store the desired information and which can be accessed by the computer 1310. Furthermore, computer storage media excludes signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. Combinations of any of the above communication media can also be included within the scope of computer-readable media.

Memory 1330 and mass storage 1350 are examples of computer-readable storage media. Depending on the exact configuration and type of computing device, memory 1330 may be volatile (e.g., RAM), non-volatile (e.g., ROM, flash memory . . . ) or some combination of the two. By way of example, the basic input/output system (BIOS), including basic routines to transfer information between elements within the computer 1310, such as during start-up, can be stored in nonvolatile memory, while volatile memory can act as external cache memory to facilitate processing by the processor(s) 1320, among other things.

Mass storage 1350 includes removable/non-removable, volatile/non-volatile computer storage media for storage of large amounts of data relative to the memory 1330. For example, mass storage 1350 includes, but is not limited to, one or more devices such as a magnetic or optical disk drive, floppy disk drive, flash memory, solid-state drive, or memory stick.

Memory 1330 and mass storage 1350 can include, or have stored therein, operating system 1360, one or more applications 1362, one or more program modules 1364, and data 1366. The operating system 1360 acts to control and allocate resources of the computer 1310. Applications 1362 include one or both of system and application software and can exploit management of resources by the operating system 1360 through program modules 1364 and data 1366 stored in memory 1330 and/or mass storage 1350 to perform one or more actions. Accordingly, applications 1362 can turn a general-purpose computer 1310 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the resource management system 100, or portions thereof, can be, or form part, of an application 1362, and include one or more modules 1364 and data 1366 stored in memory and/or mass storage 1350 whose functionality can be realized when executed by one or more processor(s) 1320.

In accordance with one particular embodiment, the processor(s) 1320 can correspond to a system on a chip (SOC) or like architecture including, or in other words integrating, both hardware and software on a single integrated circuit substrate. Here, the processor(s) 1320 can include one or more processors as well as memory at least similar to processor(s) 1320 and memory 1330, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the resource management system 100 and/or associated functionality can be embedded within hardware in a SOC architecture.

The computer 1310 also includes one or more interface components 1370 that are communicatively coupled to the system bus 1340 and facilitate interaction with the computer 1310. By way of example, the interface component 1370 can be a port (e.g., serial, parallel, PCMCIA, USB, Fire Wire . . . ) or an interface card (e.g., sound, video . . . ) or the like. In one example implementation, the interface component 1370 can be embodied as a user input/output interface to enable a user to enter commands and information into the computer 1310 by way of one or more gestures or voice input through one or more input devices (e.g., pointing device such as a mouse, trackball, stylus, touch pad, keyboard, microphone, touch screen, joystick, game pad, satellite dish, scanner, camera, other computer . . . ). In another example implementation, the interface component 1370 can be embodied as an output peripheral interface to supply output to displays (e.g., CRT, LCD, plasma . . . ), speakers, printers, and/or other computers, among other things. Still further yet, the interface component 1370 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

APPENDIX

```
class CRefCountPartitioned
{
int m_count[MAX_PARTITIONS];
}
CRefCountPartitioned::AddRef
{
part = GetCurrentPartition ( );
loop
{
    cur = m_count [part];
    if(cur != -1)
    {
       new = CAS (&m_count [part], cur + 1, cur);
       if (new == cur)
       {
          break;
       }
    }
}
}
CRefCountPartitioned::Release
{
part = GetCurrentPartition ( );
loop
{
    cur = m_count [part];
    if(cur != -1 && cur != 0)
    {
       new = CAS (&m_count [part], cur - 1, cur);
       if (new == cur)
       {
          if (cur == 1)
          {
             TryDelete ( );
          }
          break;
       }
    }
    else
    {
       // Partition is in use or 0, try another
partition
       // until it succeeds.
       //
       part = (part + 1) % MAX_PARTITIONS;
    }
}
}
CRefCountPartitioned::TryDelete
{
// 1st pass, checks whether all partitions are 0.
//
for (part = 0; part < MAX_PARTITIONS; part++)
{
    if (m_count [part] != 0)
    {
       return;
    }
}
// 2nd pass, transition 0 -> -1 and delete object.
//
for (part = 0; part < MAX_PARTITIONS; part++)
{
    if (CAS (&m_count [part], -1, 0) != 0)
    {
       // Failure, revert changes.
       //
       for (p = part -1; p >= 0; p--)
       {
          m_count [p] = 0;
       }
       return;
    }
}
    delete this;
}
```

What is claimed is:

1. A method of resource management, comprising:
employing at least one processor configured to execute computer-executable instructions stored in memory to perform the following acts:
determining a number of failures of operations that attempt to update a first reference counter, wherein the first reference counter maintains a total count of references to a resource;
generating a partitioned reference counter automatically if the number exceeds a threshold, wherein the partitioned reference counter includes a plurality of reference counter partitions, wherein each of the reference counter partitions maintains a count of references to the resource, and wherein a sum of the counts of the reference counter partitions indicates the total count of references to the resource; and
recording an additional reference to the resource by, if the partitioned reference counter has been generated, incrementing the count of a first one of the reference counter partitions.

2. The method of claim 1, wherein the acts further include, if the additional reference to the resource is released, decrementing the count of the first one of the reference counter partitions.

3. The method of claim 2, wherein the acts further include, if the additional reference to the resource is released and the count of the first one of the reference counter partitions is zero, decrementing the count of a second one of the reference counter partitions.

4. The method of claim 1, wherein the acts further include, if an initial determination indicates that all of the reference counter partitions are zero, attempting to transition the count of each of the reference counter partitions from zero to negative one.

5. The method of claim 4, wherein the acts further include, if the count of one of the reference counter partitions is greater than zero:
ceasing the transition; and
reversing any changes to the counts of the reference counter partitions made as part of the transition.

6. The method of claim 4, wherein the acts further include, if the transition of the count of each of the reference counter partitions from zero to negative one is successful, disposing of the resource.

7. The method of claim 1, wherein the acts further include recording a predetermined longstanding reference to the resource by incrementing the count of each of the reference counter partitions.

8. The method of claim 7, wherein the acts further include, if the predetermined longstanding reference to the resource is released, decrementing the count of each of the reference counter partitions.

9. The method of claim 1, wherein the acts further include recording a predetermined longstanding reference to the resource by incrementing a count of a predetermined one of the reference counter partitions.

10. The method of claim 4, wherein the acts include, if the count of one of the reference counter partitions is less than zero, delaying incrementing the count of the one of the reference counter partitions.

11. The method of claim 1, wherein the acts further include, if the partitioned reference counter has been generated:
monitoring contention for the reference counter partitions; and dynamically adjusting a number of the plurality of reference counter partitions from a first number to a second number at runtime based on the contention, wherein at the time of adjustment the sum of the counts of the second number of reference counter partitions is set equal to the sum of the counts of the first number of reference counter partitions.

12. The method of claim 1, wherein the generating the partitioned reference counter includes setting the counts of the reference counter partitions such that: at the time of the generation, the sum of the counts of the reference counter partitions is equal to the total count of the first reference counter.

13. The method of claim 1, wherein the acts further include recording the additional reference to the resource by, if the partitioned reference counter has not been generated, incrementing the total count of the first reference counter.

14. A resource management system, comprising:
a processor coupled to a memory, the processor configured to execute the following computer-executable components stored in the memory:
a first component configured to:
determine a number of failures of operations that attempt to update a first reference counter, wherein the first reference counter maintains a total count of references to a resource; and
if the number exceeds a threshold, automatically generate a partitioned reference counter, wherein the partitioned reference counter includes a plurality of reference counter partitions, wherein each of the reference counter partitions maintains a count of references to the resource, and wherein a sum of the counts of the reference counter partitions indicates the total count of references to the resource; and
a second component configured to, if the partitioned reference counter has been generated, record an additional reference to the resource by incrementing the count of a first one of the reference counter partitions.

15. The system of claim 14, wherein the computer-executable components further include a third component configured to, if the additional reference to the resource is released, decrement the count of the first one of the reference counter partitions.

16. The system of claim 14, wherein the computer-executable components further include a third component configured to record a predetermined longstanding reference to the resource by incrementing the count of each of the reference counter partitions.

17. The system of claim 16, wherein the computer-executable components further include a fourth component configured to, if the predetermined longstanding reference to the resource is released, decrement the count of each of the reference counter partitions.

18. The system of claim 14, wherein the computer-executable components further include a third component configured to dispose of the resource upon successful transition of the count of all of the reference counter partitions from zero to negative one after initially determining that the count of all of the reference counter partitions is zero.

19. The resource management system of claim 14, wherein the first component is configured to generate the partitioned reference counter by setting the counts of the reference counter partitions such that: at the time of generating the partitioned reference counter, the sum of the counts of the reference counter partitions is equal to the total count of the first reference counter.

20. The resource management system of claim 14, wherein the second component is further configured to record the additional reference to the resource by, if the partitioned reference counter has not been generated, incrementing the total count of the first reference counter.

21. A non-transitory computer-readable medium comprising processor-executable instructions, the instructions comprising:
determining a number of failures of operations that attempt to update a first reference counter, wherein the first reference counter maintains a total count of references to a resource;
generating a partitioned reference counter automatically if the number exceeds a threshold, wherein the partitioned reference counter includes a plurality of reference counter partitions, wherein each of the reference counter partitions maintains a count of references to the resource, and wherein a sum of the counts of the reference counter partitions indicates the total count of references to the resource; and
recording an additional reference to the resource by, if the partitioned reference counter has been generated, incrementing the count of a first one of the reference counter partitions.

* * * * *